US005461526A

United States Patent [19]
Hamakawa et al.

[11] Patent Number: 5,461,526
[45] Date of Patent: Oct. 24, 1995

[54] MAGNETORESISTIVE READ HEAD AND MAGNETIC STORAGE SYSTEM USING THE SAME

[75] Inventors: Yoshihiro Hamakawa, Urawa, Japan; Toshio Kobayashi, Santa Barbara, Calif.; Naoki Koyama, Kokubunji; Masahiro Kitada, Hamura, both of Japan

[73] Assignee: Hitachi, Ltd., Tokyo, Japan

[21] Appl. No.: 36,364

[22] Filed: Mar. 24, 1993

[30] Foreign Application Priority Data

Mar. 24, 1992 [JP] Japan ................................. 4-065749

[51] Int. Cl.$^6$ .................................................. G11B 5/39
[52] U.S. Cl. ...................................................... 360/113
[58] Field of Search ........................ 360/113; 338/32 R; 324/252

[56] References Cited

U.S. PATENT DOCUMENTS

| | | | |
|---|---|---|---|
| 3,840,898 | 10/1974 | Bajorek et al. | 360/113 |
| 4,785,366 | 11/1988 | Krounbi et al. | 360/113 |
| 4,879,619 | 11/1989 | Fontana, Jr. et al. | 360/113 |
| 5,005,096 | 4/1991 | Krounbi | 360/113 |

FOREIGN PATENT DOCUMENTS 60-59518  4/1985  Japan .

OTHER PUBLICATIONS

C. Denis Mee & Eric D. Daniel, *Magnetic Recording Handbook*, 1990 p. 307.
U.S. application No. 475,611 (JP-A-3-242983) Sep. 1990.

Primary Examiner—Stuart S. Levy
Assistant Examiner—David P. Davis
Attorney, Agent, or Firm—Antonelli, Terry, Stout & Kraus

[57] ABSTRACT

A magnetoresistive read head includes a magnetoresistive layer having a central active region and end domain control regions, an electrode layer connected to both ends of the magnetoresistive layer, a pattern for providing a transverse bias to the magnetoresistive layer, a soft magnetic film provided on both sides of the magnetoresistive layer for magnetically shielding the magnetoresistive layer, and a substrate for supporting the magnetoresistive layer, pattern and soft magnetic film. A distance between the two end domain control regions of the magnetoresistive layer indicative of a length of the central active region is smaller than a distance between inner end faces of the electrode layer and the distance between the inner end faces of the magnetoresistive substantially corresponds to a read track width. Since both inner end faces of the magnetoresistive layer are set to coincide with the inner end faces of the electrode layer or to be positioned inside thereof, the magnetoresistive read head can prevent generation of Barkhausen noise with a good yield. Further, a track width is determined substantially by the distance between the inner end faces of the hard magnetic layer so that there can be obtained a magnetoresistive read head which is good in its off-track characteristic as well as a magnetic storage system which uses the read head.

17 Claims, 6 Drawing Sheets

SHIFT BETWEEN CENTRAL POSITIONS OF INNER END FACES OF ELECTRODE AND HARD MAGNETIC LAYERS

MAGNETORESISTIVE READ HEAD AND MAGNETIC STORAGE SYSTEM USING THE SAME

BACKGROUND OF THE INVENTION

The present invention relates to a read head for reading out an information signal from a magnetic storage medium and more particularly, to an improved magnetoresistive read head and a magnetic storage system using the head.

Conventionally, a magnetic read transducer called a magnetoresistive (MR) sensor or head is known. It is also known that such a sensor can read data from a magnetic medium having a large linear density. The MR sensor, which utilizes a variation in the resistance of a read element made of magnetoresistive material, detects a magnetic signal as a function with respect to the magnitude and direction of magnetic flux detected by the element.

It is also known in the prior art that, in order to optimumly operate the MR element, it is necessary to apply two magnetic bias fields to the element. For the purpose of biasing the MR element to linearly respond to magnetic flux, in general, transverse biasing field is used. This biasing field is parallel to the flat surface of the MR element and vertical to the plane of the magnetic medium. There are various ways of applying the transverse biasing field, including current bias, shunt bias, soft bias, and soft adjacent layer (SAL) bias. These transverse biases are generated at such a level as to sufficiently bias the head in the most linear range of its resistivity-magnetic field (R-H) curve.

Among the other biasing magnetic fields used for the MR element, longitudinal bias magnetic field called so by those skilled in the art is parallel to the surface of the magnetic medium and also parallel to the longitudinal direction of the MR element. The longitudinal bias magnetic field acts to suppress Barkhausen noise caused by the multi-domain of the MR element.

Many MR sensor biasing methods and systems have been conventionally developed. However, as the recording density becomes large, it has become necessary to make narrower its recording track and larger a linear density along the track. Such a small MR element as to satisfy the requirements cannot be realized by the prior art methods.

The problem in the prior art has been conceptionally solved by employing a patterned longitudinal biasing. Its solution method is disclosed in JP-A-60-59518. In this invention, in short, the end regions of an MR layer are put in suitable single domain condition so that the single domain condition is induced within the central active region of the MR layer. This can be realized by generating a longitudinal biasing only within the end regions of the MR layer. In the conceptional embodiment, the longitudinal biasing is realized by the ferromagnetic exchange coupling or magnetostatic coupling between a hard magnetic layer and the MR layer.

Also disclosed in JP-A-60-59518 is a method for realizing the longitudinal biasing based on the ferromagnetic coupling when a ferromagnetic layer having a coercivity larger than the MR layer is provided only at the overlapped part of an electrode and the MR layer. In the invention, the MR layer has a thickness of 200–1000 angstroms and the ferromagnetic layer having a larger coercivity has a thickness of 500–3000 angstroms.

In U.S. Pat. No. 5,005,096 (JP-A-2-220213), another method for realizing the longitudinal biasing based on the magnetostatic coupling between a hard magnetic layer and an MR layer is disclosed. In this method, the inherent coercivity of the hard magnetic layer exchange-coupled to the soft magnetic MR layer substantially disappears (which is disadvantageous in the perpetuity of the biasing). In addition, for the purpose of avoiding the adverse influence of the magnetic flux from the hard magnetic layer on a transverse sensitivity profile, the hard magnetic layer is arranged to be parallel to the MR layer and also be spaced from the MR layer. In actual, a non-magnetic spacer layer is inserted between the hard magnetic thin film and the end domain control regions of the MR layer and the thickness of the hard magnetic thin film is selected so that a magnetic flux ratio has a desirable value between the magnetic flux of the end magnetic control regions of the MR layer and the vertical magnetic flux of the central active region of the MR layer. Also explained in the patent is that, to this end, it is preferable that the spacer layer has a thickness of 50–200 nm and the electrically conductive non-magnetic material is Cr, W, Nb or Ta.

In any one of the prior art methods, the inner end faces of the end magnetic control regions directly contacted with the hard magnetic layer coincides with the inner end faces of the electrode or the inner end faces of the electrode are located inside of the inner end faces of the end magnetic control regions, so that the track width of the magnetoresistive element is determined substantially by a distance between the inner end faces of the electrode.

When it is desired to fabricate such a magnetoresistive element on a mass production basis, the center between the inner end faces of the end magnetic domain control regions may be shifted from the center between the inner end faces of the electrode so that one of the inner end faces of the end magnetic control regions is shifted largely outwardly of the associated inner end face of the electrode. When the inner end face of the end magnetic control region is shifted largely outwardly of the associated inner end face of the electrode, the vertical biasing by the hard magnetic layer may not be able to be sufficiently applied to the vicinity of the ends of the electrode. Thus, it sometimes occurs that it is impossible to suppress the generation of magnetic walls induced by stress concentration or the like in the vicinity of the ends of the electrode and thus to suppress Barkhausen noise.

SUMMARY OF THE INVENTION

It is an object of the present invention to provide a magnetoresistive read head which can suppress Barkhausen noise with a high yield as well as a magnetic storage system which uses the read head.

Another object of the present invention is to provide a magnetoresistive read head which track width is determined by a distance between the inner end faces of end magnetic control regions and which is good in its off-track characteristic, and also to provide a magnetic storage system which uses the read head.

In the present invention, for the purpose of solving the above problem in the prior art, the distance between the inner end faces of the end magnetic control regions is made smaller than a distance between the inner end faces of an electrode. Further, pattern is formed so that both of the inner end faces of the end magnetic control regions coincide with the inner end faces of the electrodes or are positioned inside thereof.

In accordance with an aspect of the present invention, the distance between the inner end faces of the end magnetic control regions is made smaller than a distance between the inner end faces of the electrode, so that, even when the center position between the inner end faces of the hard magnetic layer are shifted from the center position between the inner end faces of the electrode during preparation process, both of the inner end faces of the end magnetic control regions coincide with the inner end faces of the electrode or are positioned inside thereof, whereby a vertical biasing sufficient to suppress magnetic walls generated at the ends of the electrode can be applied to the vicinity of the electrode. Accordingly, there can be obtained a magnetoresistive read head which prevents the generation of Barkhausen noise with a high yield. Further, a track width is determined substantially by the distance between the inner end faces of the end magnetic control regions and thus there can be obtained a magnetoresistive read head which is good in its off-track characteristic.

DESCRIPTION OF THE PREFERRED EMBODIMENTS

Figure 1:
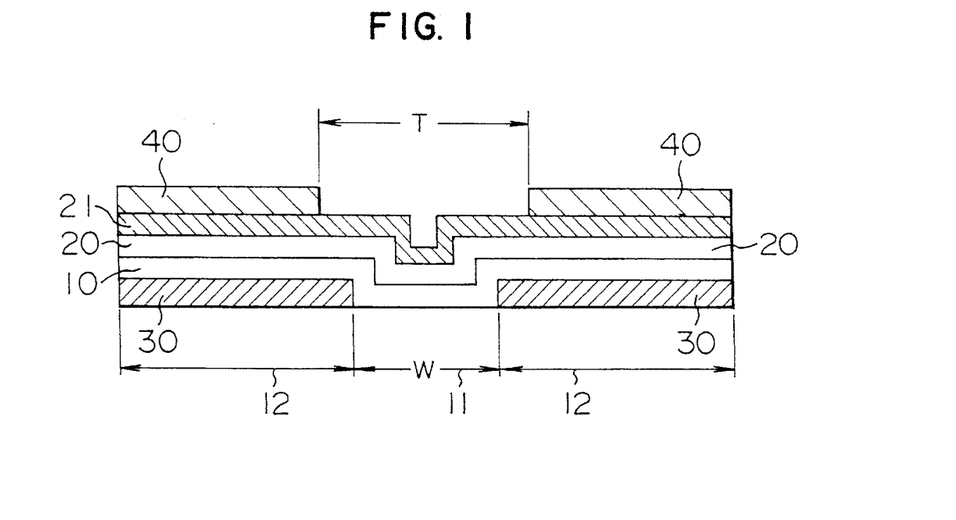
FIG. 1 is a cross-sectional view of a magnetoresistive read head in accordance with a first embodiment of the present invention.

Embodiment 1:

A typical magnetoresistive (MR) read head in accordance with the present invention comprises, as shown in FIG. 1, a magnetoresistive layer 10, a shunt film 20 for application of a transverse bias, a soft adjacent layer (SAL) film 21, a hard magnetic layer 30 for application of a longitudinal bias, and an electrode layer 40. The magnetoresistive layer 10 is divided into a central active region 11 for detecting a magnetic field from a medium and end magnetic control regions 12 for controlling the magnetic domain structure of the central active region to suppress the generation of Barkhausen effect. In the present invention, the magnetoresistive layer 10 is biased in a manner different from the method disclosed in JP-A-60-59518 and U.S. Pat. No. 5,005,096. That is, both of longitudinal and transverse biases are both applied to the central active region 11.

In this example, the longitudinal, which is parallel to the magnetoresistive layer 10, is generated by the hard magnetic layer 30 which has spaced portions directly contacting and delimiting the end magnetic control regions 12. The transverse bias, on the other hand, is generated by the shunt film 20 and soft adjacent layer (SAL) film 21 which are parallel to the magnetoresistive layer 10. The electrode layer 40 is an electric path which transmits a signal detection current and a bias current to the magnetoresistive layer 10 and the shunt film 20 to thereby transmit an output signal to an external electric circuit. When a distance between the inner end faces of the electrode layer 40 is denoted by T and a distance between the inner end faces of the hard magnetic layer 30 is denoted by W, a relationship T>W is satisfied in this example. Further, the both inner end faces of the hard magnetic layer are both set to coincide with the inner end faces of the electrode or to be inside thereof.

In the present embodiment, the thickness of the magnetoresistive layer was set to be between 5 and 20 nm, the thickness of the hard magnetic layer was to be between 10 and 100 nm, and the thickness of the shunt layer was to be between 10 and 50 nm. Further, the magnetoresistive layer was made of an Ni-Fe alloy, the hard magnetic layer was made of a CoPtCr alloy, and the shut film was made of a Nb material. As the material of the hard magnetic layer, Co alloy-series magnetic recording medium material such as CoPt alloy, CoPtPd alloy, CoPtNi alloy or CoCrTa alloy, or other hard magnetic material was effectively employed. When the residual magnetic flux density of the hard magnetic layer is above 1.0 T, a read output abruptly decreases. For this reason, the residual magnetic flux density is set to be preferably below 1.0 T.

Figure 2:
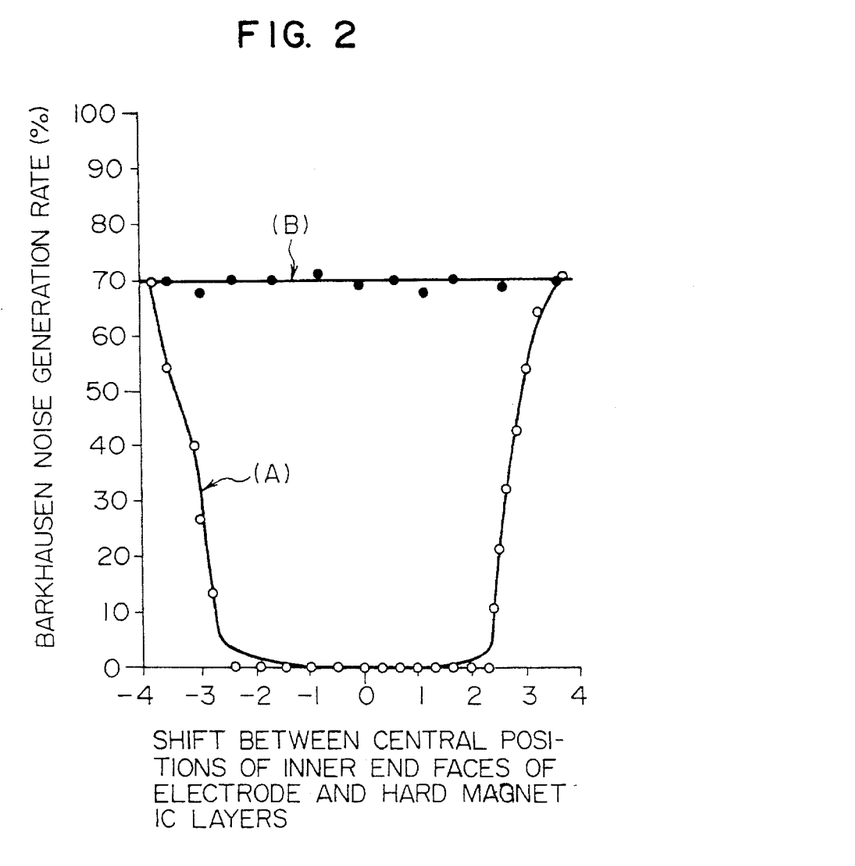
FIG. 2 shows a relationship between a shift between centers and Barkhausen noise generation rate, one center between the inner end faces of a hard magnetic layer and the other between the inner end faces of an electrode.

Shown in FIG. 2 is a relationship between a shift S between the centers and Barkhausen noise generation rate, one center between the inner end faces of the hard magnetic layer and the other between the inner end faces of the electrode in FIG. 1. In FIG. 2, the 'Barkhausen noise generation rate' refers to the number of heads (in percentage) in which Barkhausen noise occurred when 100 heads are measured.

In FIG. 2, a curve (A) denotes a characteristic when W=3 µm and T=7 µm and a curve (B) denotes a characteristic when W=µm and T=3 µ. Being positive in S means that the center of the inner end faces of the hard magnetic layer is shifted rightward (in FIG. 1) with respect to the center of the inner end faces of the electrode layer. In the case of the curve (B), the Barkhausen noise generation rate is large. Meanwhile, in the case of the curve (A), when S is small, no Barkhausen noise occurs. However, as S becomes large, the Barkhausen noise generation rate abruptly increases. In particular, the Barkhausen noise abruptly takes place from the vicinity of the point where the inner end faces of the hard magnetic layer start to be shifted from the inner end faces of the electrode layer.

In other words, in the case of (A), a margin relating to a shift between the patterns of the hard magnetic and electrode layers can be made large and thus the head can be prepared with a good yield, when compared to the case of (B).

The thinner the magnetoresistive layer is, it is possible to make larger a current density necessary for signal detection, which preferably leads to an increase in a signal read output. When the thickness of the magnetoresistive layer is below 20 nm, a substantially high read output was obtained. This is because the thinner the the magnetoresistive layer is the less, the amount of heat generated by the current flowing therethrough is and the more the deterioration of the magnetoresistive layer caused by electron migration is suppressed. Meanwhile, as the thickness of the thinner the magnetoresistive layer decreases, defects such as pin holes in the layer tend to more frequently take place. Thus, the substantially usable thickness of the magnetoresistive layer was above 5 nm.

Figure 3:
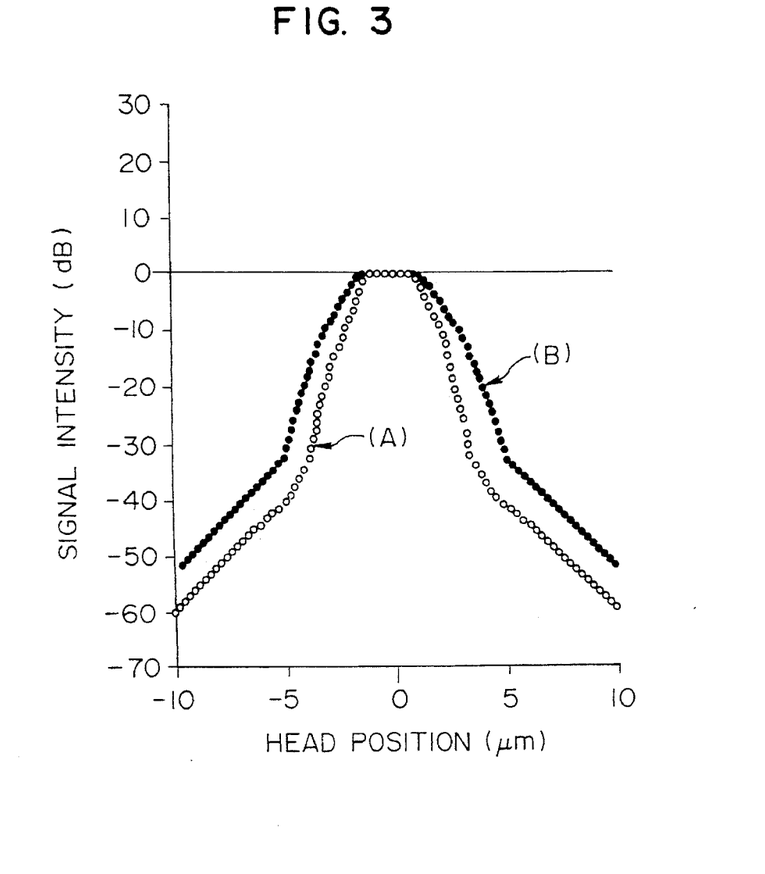
FIG. 3 shows off-track characteristics of the magnetoresistive read head of the embodiment of the invention and of a prior art magnetoresistive read head for comparison.

FIG. 3 shows off-track characteristics (A) and (B) of an inductive write/magnetoresistive read type head when W=3 µm, T=7 µm and S=0 µm and when W=7 µm, T=3 µm and S=0 µm, respectively. Used as a write head is an induction type magnetic head having a track width of 5 µm. In the case of the curve (A), a magnetoresistive read head is shifted 7 µm from the signal stored by the storage head, a signal intensity was attenuated 30 dB. In the case of the curve (B), the corresponding signal intensity was 10 µm.

In this way, the curve (A) is excellent in off-track characteristic over the curve (B), and the track width of the magnetoresistive read head is determined substantially by the distance between the inner end faces of the hard magnetic layer.

In the magnetoresistive (MR) read head of FIG. 1, the hard magnetic layer 30 for application of the longitudinal bias was replaced by such an FeMn-series anti-ferromagnetic material layer as FeMn, FeMnNi or FeMnRu, or an other alloy-series anti-ferromagnetic material layer, or an anti-ferromagnetic material layer as NiO to generate a longitudinal bias based on anti-ferromagnetic exchange coupling. Even in this case, substantially the same effects as the hard magnetic layer 30 could be obtained.

Figure 8:
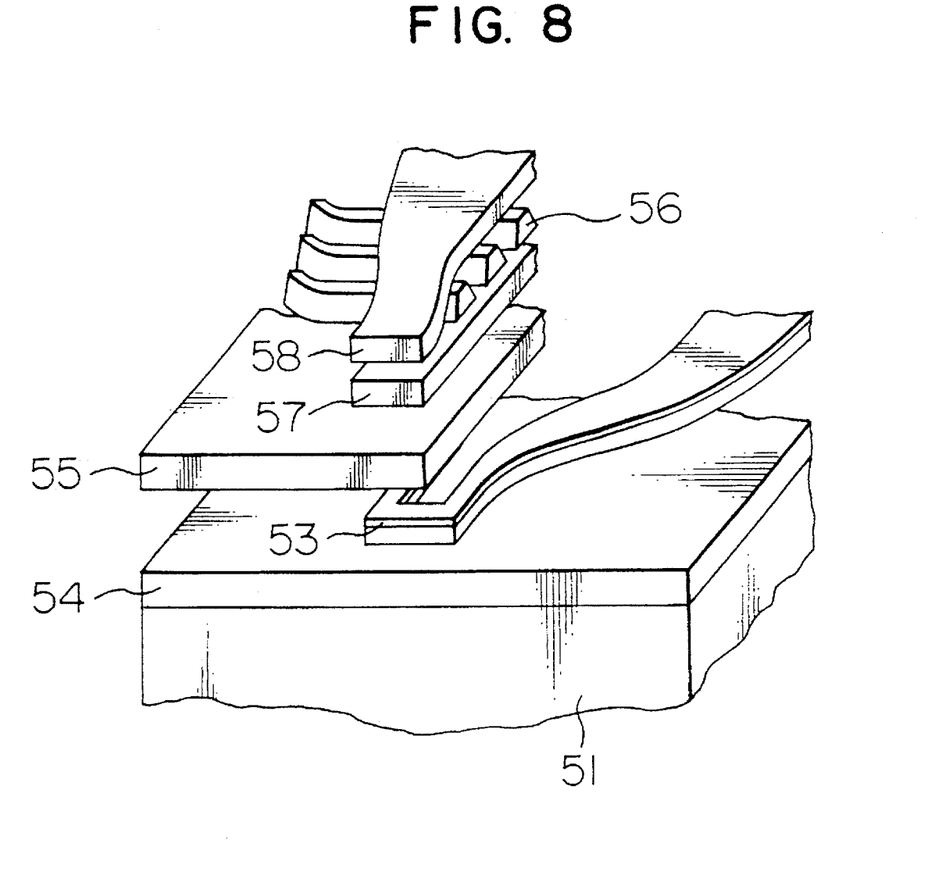
FIG. 8 is a perspective view of an inductive write/magnetoresistive read type head in accordance with an embodiment of the present invention.

Turning now to FIG. 8, there is shown a perspective view of an inductive write/magnetoresistive read type head which uses the magnetoresistive read head according to the present invention. In this case, with respect to the inductive write/magnetoresistive read type head, an induction type magnetic head is used for storage or recording, while a magnetoresistive read head is used for reproduction or reading. More specifically, that part of the inductive write/magnetoresistive read type head of FIG. 8 where the magnetoresistive read head 53 of the present invention is disposed between shield layers 54 and 55, acts as the read heat; whereas, that part of the inductive write/magnetoresistive read type head where a coil 56 is disposed between two recording magnetic poles 57 and 58, acts as the recording head. The inductive write/magnetoresistive read type head can generate no Barkhausen noise and can offer a narrow track density.

Figure 9A:
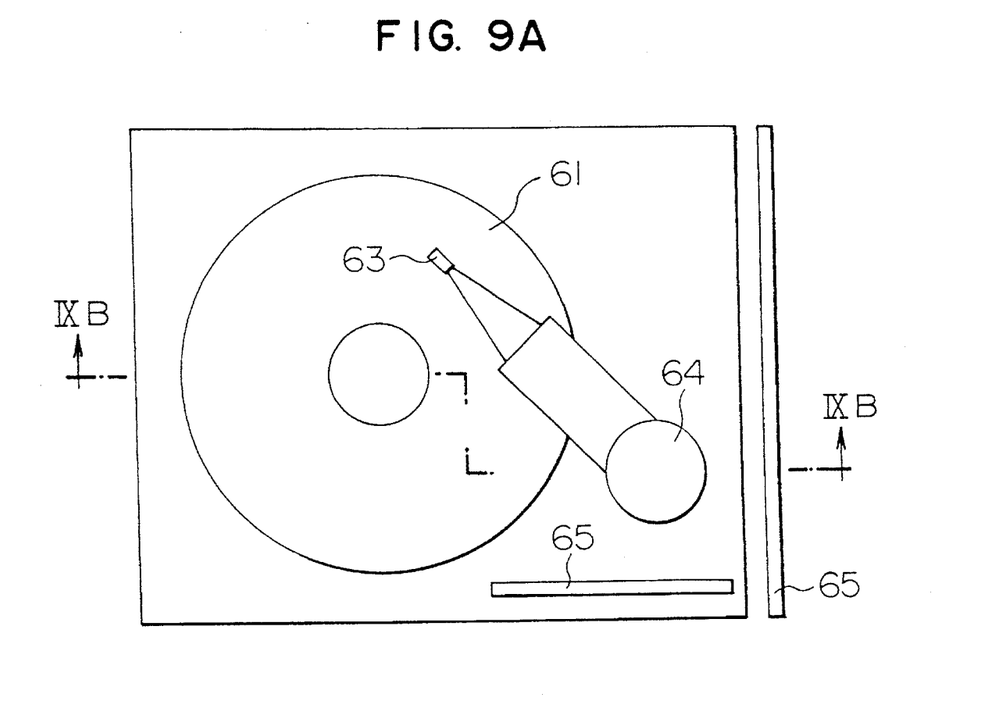
FIGS. 9A and 9B show a plan view, in a model form, of an inductive write/magnetoresistive read type head in accordance with an embodiment of the present invention and a cross-sectional view thereof when taken along line A—A'.
Figure 9B:
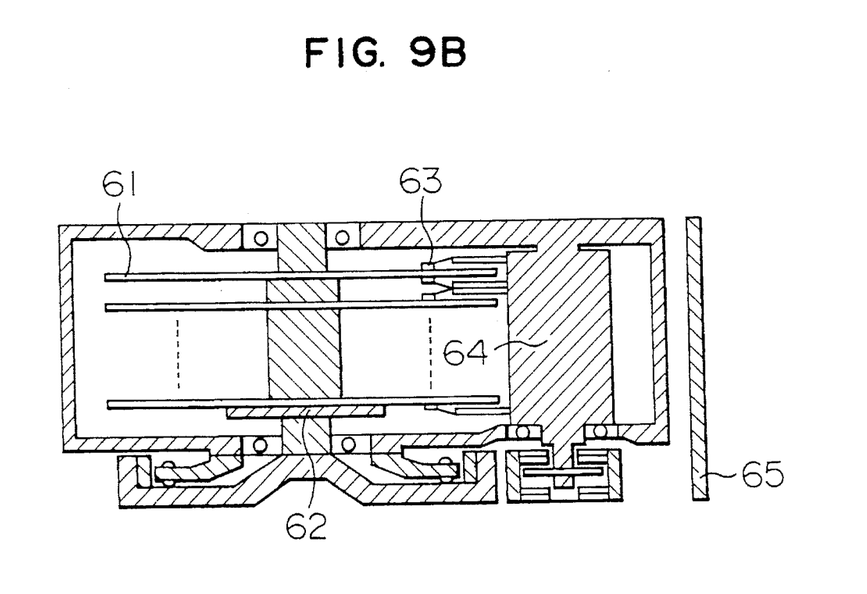

FIG. 9A shows a plan view, in a model form, of a magnetic storage/read system which uses the inductive write/magnetoresistive read type head of FIG. 8 and FIG. 9B shows a cross-sectional view thereof. The magnetic storage/read system of FIGS. 9A and 9B has a known structure which comprises a magnetic recording medium 61, a driver 62 for driving rotatably the magnetic medium 61, an inductive write/magnetoresistive read type head 63 of the present invention, a drive means 64 for driving the head 63, and a recording/reading means 65 for the inductive write/magnetoresistive read type head 63. The magnetic storage system using the magnetoresistive read head of the present invention was larger in memory capacity and smaller in size than those of the prior art system.

Figure 4:
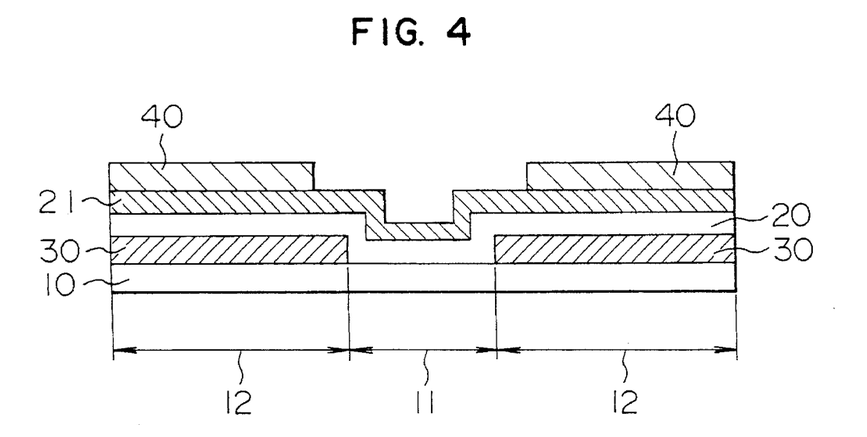
FIG. 4 is a cross-sectional view of a magnetoresistive read head in accordance with a second embodiment of the present invention.

Embodiment 2:

A magnetoresistive (MR) read head in accordance with another embodiment of the present invention is shown in FIG. 4. The illustrated read head comprises a magnetoresistive layer 10, a shunt film 20 for application of transverse bias, a soft adjacent layer (SAL) film 21, a hard magnetic layer 30 for application of longitudinal bias, and an electrode layer 40. The magnetoresistive layer 10 is divided into a central active region 11 for detecting a magnetic field from a medium and end magnetic control regions 12 for controlling the magnetic domain structure of the central active region to suppress the generation of Barkhausen noise.

The present embodiment is different from the embodiment 1 in that the hard magnetic layer 30 is provided on the magnetoresistive layer 10. This enables the magnetoresistive layer 10 to be formed flat all thereover, so that the stress influence, which would be caused by the stepped part of the hard magnetic layer in FIG. 1, can be softened. Even with such a magnetoresistive read head, a distance between the inner end faces of the hard magnetic layer is set to be smaller than a distance between the inner end faces of the electrode layer, so that, even when the center position between the inner end faces of the hard magnetic layer are shifted from the center position between the inner end faces of the electrode during preparation process, both of the inner end faces of the end magnetic control regions coincide with the inner end faces of the electrode or are positioned inside thereof, whereby a longitudinal biasing sufficient to suppress magnetic walls generated at the ends of the electrode can be applied to the vicinity of the electrode. Accordingly, the present embodiment can provide substantially the same effects as the embodiment 1 with respect to the Barkhausen noise generation rate and off-track characteristic. Further, even when the hard magnetic layer 30 for application of the longitudinal bias is replaced by such an anti-ferromagnetic material layer as in the embodiment 1, substantially the same effects as the hard magnetic layer 30 for application of the longitudinal bias were obtained even in the present embodiment.

Figure 5:
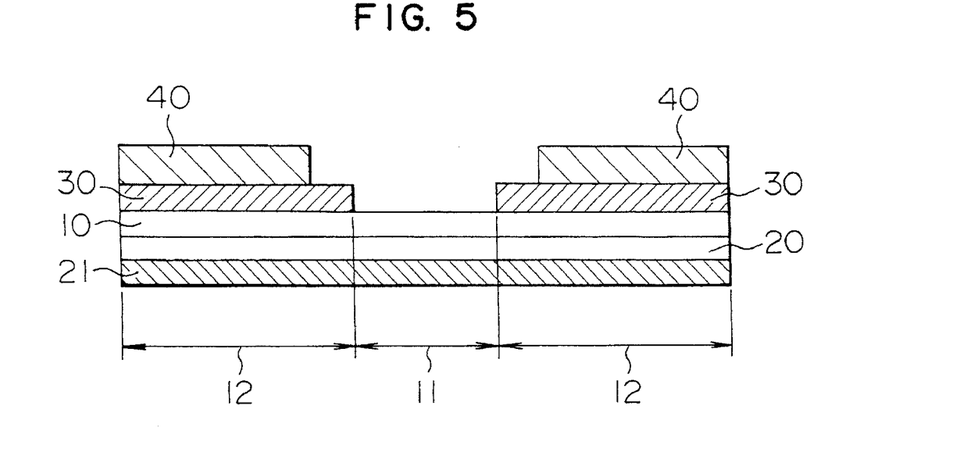
FIG. 5 is a cross-sectional view of a magnetoresistive read head in accordance with a third embodiment of the present invention.

Embodiment 3:

A magnetoresistive (MR) read head in accordance with another embodiment of the present invention is shown in FIG. 5. The illustrated read head comprises a magnetoresistive layer 10, a shunt film 20 for application of transverse bias, a soft adjacent layer (SAL) film 21, a hard magnetic layer 30 for application of longitudinal bias, and an electrode layer 40. The magnetoresistive layer 10 is divided into a central active region 11 for detecting a magnetic field from a medium and end magnetic control regions 12 for controlling the magnetic domain structure of the central active region to suppress the generation of Barkhausen noise.

The present embodiment is different from the embodiments 1 and 2 in that the hard magnetic layer 30 and the electrode layer 40 are provided above the soft adjacent layer (SAL) film 21, shunt film 20 and magnetoresistive layer 10. This enables the soft adjacent layer (SAL) film 21, shunt film 20 and magnetoresistive layer 10 to be formed flat all thereover, so that the stress influence, which would be caused by the stepped parts of the soft adjacent layer (SAL) film 21 and magnetoresistive layer 10 in FIG. 1, can be softened. Even with such a magnetoresistive read head, a distance between the inner end faces of the hard magnetic layer is set to be smaller than a distance between the inner end faces of the electrode layer, so that, even when the center position between the inner end faces of the hard magnetic layer are shifted from the center position between the inner end faces of the electrode during preparation process, both of the inner end faces of the hard magnetic layer coincide with the inner end faces of the electrode or are positioned inside thereof, whereby a vertical biasing sufficient to suppress magnetic walls generated at the ends of the electrode can be applied to the vicinity of the electrode. Accordingly, the present embodiment can provide substantially the same effects as the embodiments 1 and 2 with respect to the Barkhausen noise generation rate and off-track characteristic. Further, even when the hard magnetic layer 30 for application of the longitudinal bias is replaced by such an anti-ferromagnetic material layer as in the embodiment 1, substantially the same effects as the hard magnetic layer 30 for application of the longitudinal bias were obtained even in the present embodiment.

Figure 6A:
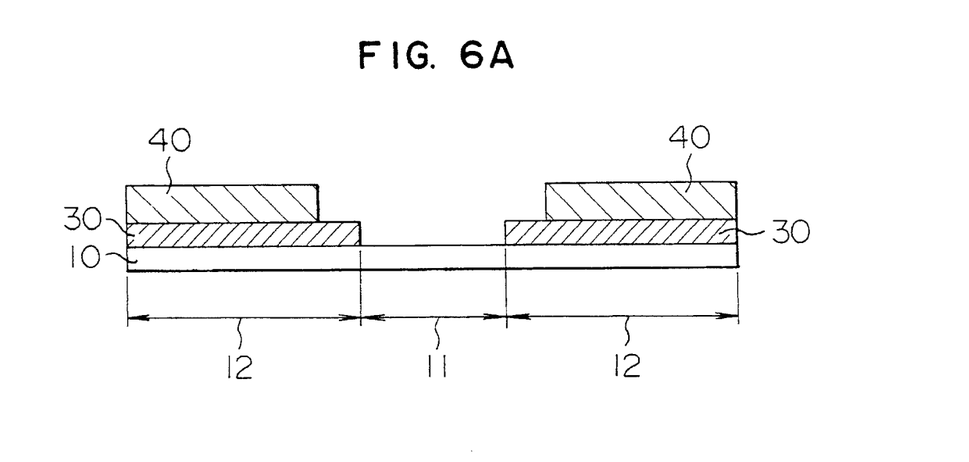
FIGS. 6A and 6B are cross-sectional views of a magnetoresistive read head in accordance with a fourth embodiment of the present invention.
Figure 6B:
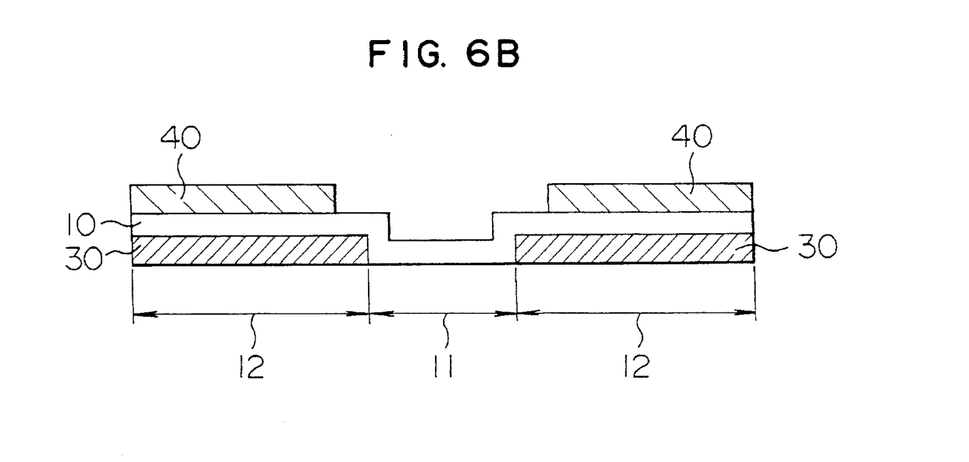

Embodiment 4:

A magnetoresistive (MR) read head in accordance with another embodiment of the present invention is shown in FIGS. 6A and 6B. The illustrated read head comprises a magnetoresistive layer 10, a shunt film 20 for application of transverse bias, a hard magnetic layer 30 for application of longitudinal bias, and an electrode layer 40. The magnetoresistive layer 10 is divided into a central active region 11 for detecting a magnetic field from a medium and end magnetic control regions 12 for controlling the magnetic domain structure of the central active region to suppress the generation of Barkhausen noise.

The present embodiment is different from the embodiments 1, 2 and 3 in that only the shunt film 20 is used for application of the transverse bias. Even with such a magnetoresistive read head, a distance between the inner end faces of the hard magnetic layer is set to be smaller than a distance between the inner end faces of the electrode layer, so that, even when the center position between the inner end faces of the hard magnetic layer are shifted from the center position between the inner end faces of the electrode during preparation process, both of the inner end faces of the hard magnetic layer coincide with the inner end faces of the electrode or are positioned inside thereof, whereby a longitudinal biasing sufficient to suppress magnetic walls generated at the ends of the electrode can be applied to the vicinity of the electrode. Accordingly, the present embodiment can provide substantially the same effects as the embodiments 1, 2 and 3 with respect to the Barkhausen noise generation rate and off-track characteristic. Further, even when the hard magnetic layer 30 for application of the longitudinal bias is replaced by such an anti-ferromagnetic material layer as in the embodiment 1, substantially the same effects as the hard magnetic layer 30 for application of the longitudinal bias were obtained even in the present embodiment.

Figure 7A:
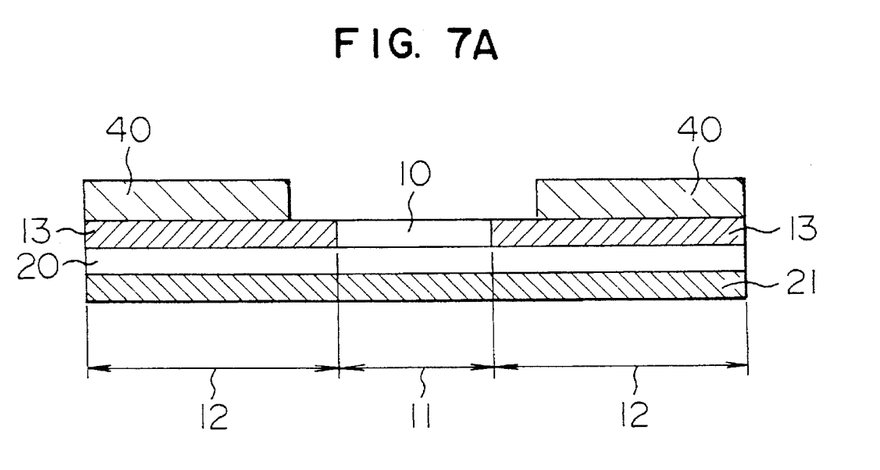
FIGS. 7A and 7B are cross-sectional views of a magnetoresistive read head in accordance with a fifth embodiment of the present invention.
Figure 7B:
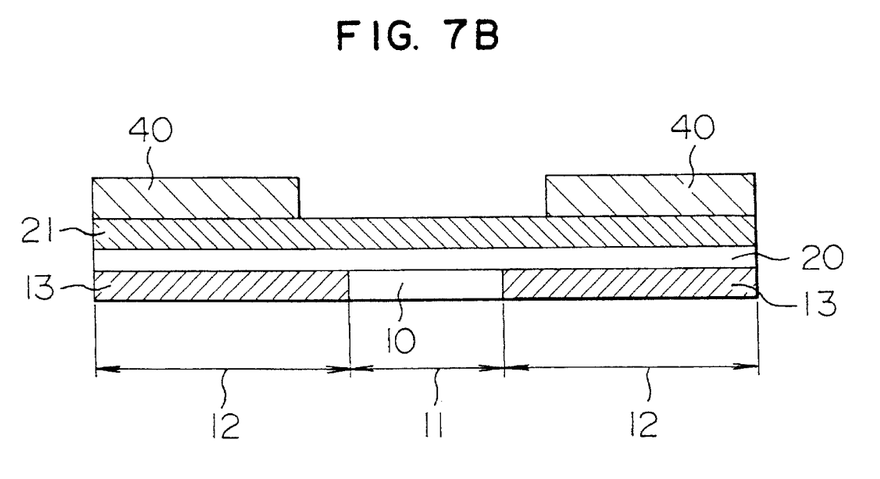

Embodiment 5:

A magnetoresistive (MR) read head in accordance with another embodiment of the present invention is shown in FIGS. 7A and 7B. The illustrated read head comprises a magnetoresistive layer 10, a shunt film 20 for application of transverse bias, and an electrode layer 40. The magnetoresistive layer 10 is divided into a central active region 11 for detecting an information magnetic field from a medium and end magnetic control regions 12 for controlling the magnetic domain structure of the central active region to suppress the generation of Barkhausen noise.

In the present embodiment, a high coercivity was provided to an end magnetic domain control layer (high coercivity layer 13) is in substantially the same manner as disclosed in U.S. patent application No. 475,611 (JP-A-3-242983).

Even with such a magnetoresistive read head, a distance between the inner end faces of the end domain control layer is set to be smaller than a distance between the inner end faces of the electrode layer, so that, even when the center position between the inner end faces of the end domain control layer are shifted from the center position between the inner end faces of the electrode during preparation process, both of the inner end faces of the end magnetic domain control regions coincide with the inner end faces of the electrode or are positioned inside thereof, whereby a longitudinal biasing sufficient to suppress magnetic walls generated at the ends of the electrode can be applied to the vicinity of the electrode. Accordingly, the present embodiment can provide substantially the same effects as the embodiments 1, 2, 3 and 4 with respect to the Barkhausen noise generation rate and off-track characteristic.

Even when the high coercivity is provided to the end magnetic domain control region by an implantation process using such metal ions as Co ions, substantially the same effects were obtained.

In the present invention, during the preparation process of the magnetoresistive read head, the distance between the inner end faces of the end domain control layer is shifted from the center position between the inner end faces of the electrode, both of the inner end faces of the end magnetic domain control layer coincide with the inner end faces of the electrode or are positioned inside thereof, whereby a vertical biasing sufficient to suppress magnetic walls generated at the ends of the electrode can be applied to the vicinity of the electrode. Accordingly, there can be obtained a magnetoresistive read head which prevents generation of Barkhausen noise with a high yield. Further, the track width is determined substantially by the distance between the inner end faces of the end domain control layer, so that there can be obtained a magnetoresistive read head which is good in its off-track characteristic.

Furthermore, an inductive write/magnetoresistive read type head, which corresponds to a combination of the magnetoresistive read head of the present invention as its read head and an induction type magnetic head as its storage or recording head, could generate no Barkhausen noise and realize a narrow track density. A magnetic storage system using such an inductive write/magnetoresistive read type head could be made large in memory capacity and small in size.

What is claimed is:

1. A magnetoresistive read head comprising:

a magnetoresistive layer having a central active region and end domain control regions;

an electrode layer connected to both ends of the magnetoresistive layer;

a first pattern for providing a transverse bias to the magnetoresistive layer;

a second pattern having spaced portions directly contacting and delimiting the end domain control regions of the magnetoresistive layer for providing a longitudinal bias to the magnetoresistive layer;

a soft magnetic film provided on opposite sides of the magnetoresistive layer for magnetically shielding the magnetoresistive layer; and a substrate for supporting the magnetoresistive layer, the electrode layer, the first pattern, the second pattern, and the soft magnetic film;

wherein a distance between the two end domain control regions of the magnetoresistive layer as delimited by the spaced portions of the second pattern is smaller than a distance between inner end faces of the electrode layer; and wherein the distance between the two end domain control regions of the magnetoresistive layer as delimited by the spaced portions of the second pattern defines a length of the central active region of the magnetoresistive layer and substantially corresponds to a read track width.

2. A magnetoresistive read head according to claim 1, wherein a coercivity of the end domain control regions of said magnetoresistive layer is larger than a coercivity of the central active region.

3. A magnetoresistive read head according to claim 1, wherein the second pattern includes a hard magnetic layer directly contacting the end domain control regions of said magnetoresistive layer for generating a longitudinal bias based on magnetic and ferromagnetic exchange coupling to maintain the central active region of said magnetoresistive layer in a single domain state.

4. A magnetoresistive read head according to claim 3, wherein a residual magnetic flux density of said hard magnetic layer is lower than 1.0 T.

5. A magnetoresistive read head according to claim 3, wherein the hard magnetic layer is a hard magnetic film made of Co alloy material.

6. A magnetoresistive read head according to claim 1, wherein the second pattern includes an antiferromagnetic layer directly contacting the end domain control regions of said magnetoresistive layer for generating a longitudinal bias based on antiferromagnetic exchange coupling to maintain the central active region of said magnetoresistive layer in a single domain state.

7. A magnetoresistive read head according to claim 1, wherein the second pattern includes a film of an element diffusion source directly contacting the end domain control regions of said magnetoresistive layer, and wherein said end domain control regions are treated by heat for diffusion to form a hard magnetic material.

8. A magnetoresistive read head according to claim 1, wherein the end domain control regions of said magnetoresistive layer are formed by implanting ions into said magnetoresistive layer.

9. An inductive write/magnetoresistive read magnetic head comprising:

a magnetoresistive read head according to claim 1; and an inductive write head.

10. A magnetic storage system comprising:

a magnetic recording medium;

means for driving said magnetic recording medium;

an inductive write/magnetoresistive read head including a magnetoresistive read head and an inductive write head;

means for driving the inductive write/magnetoresistive read head; and a write/read signal system;

wherein said magnetoresistive read head includes:

a magnetoresistive layer having a central active region and end domain control regions;

an electrode layer connected to both ends of said magnetoresistive layer;

a first pattern for providing a transverse bias to said magnetoresistive layer;

a second pattern having spaced portions directly contacting and delimiting the end domain control regions of the magnetoresistive layer for providing a longitudinal bias to the magnetoresistive layer;

a soft magnetic film provided on opposite sides of said magnetoresistive layer for magnetically shielding said magnetoresistive layer; and a substrate for supporting the magnetoresistive layer, the electrode layer, the first pattern, the second pattern, and the soft magnetic film;

wherein a distance between the two end domain control regions of said magnetoresistive layer as delimited by the spaced portions of the second pattern is smaller than a distance between inner end faces of said electrode layer; and wherein the distance between the two end domain control regions of said magnetoresistive layer as delimited by the spaced portions of the second pattern defines a length of the central active region of the magnetoresistive layer and substantially corresponds to a read track width.

11. A magnetic storage system according to claim 10, wherein a coercivity of the end domain control regions of said magnetoresistive layer is larger than a coercivity of the central active region.

12. A magnetic storage system according to claim 10, wherein the second pattern includes a hard magnetic layer directly contacting the end domain control regions of said magnetoresistive layer for generating a longitudinal bias based on magnetic and ferromagnetic exchange coupling to maintain the central active region of said magnetoresistive layer in a single domain state.

13. A magnetic storage system according to claim 12, wherein a residual magnetic flux density of said hard magnetic layer is lower than 1.0 T.

14. A magnetic storage system according to claim 12, wherein the hard magnetic layer is a hard magnetic film made of Co alloy material.

15. A magnetic storage system according to claim 10, wherein the second pattern includes an antiferromagnetic layer directly contacting the end domain control regions of said magnetoresistive layer for generating a longitudinal bias based on antiferromagnetic exchange coupling to maintain the central active region of said magnetoresistive layer in a single domain state.

16. A magnetic storage system according to claim 10, wherein the second pattern includes a film of an element diffusion source directly contacting the end domain control regions of said magnetoresistive layer, and wherein said end domain control regions are treated by heat for diffusion to form a hard magnetic material.

17. A magnetic storage system according to claim 10, wherein the end domain control regions of said magnetoresistive layer are formed by implanting ions into said magnetoresistive layer.

* * * * *